(12) United States Patent
Fiala

(10) Patent No.: US 8,740,210 B2
(45) Date of Patent: Jun. 3, 2014

(54) ELEVATED CUTTING BOARD APPARATUS FOR REDUCING FAT IN PAN-COOKED FOODS

(76) Inventor: Gary Fiala, Wheaton, IL (US)

( * ) Notice: Subject to any disclaimer, the term of this patent is extended or adjusted under 35 U.S.C. 154(b) by 0 days.

(21) Appl. No.: 13/553,771

(22) Filed: Jul. 19, 2012

(65) Prior Publication Data

US 2014/0021672 A1    Jan. 23, 2014

(51) Int. Cl.
*B23Q 3/00*    (2006.01)
*B25B 1/00*    (2006.01)
*F24C 15/10*   (2006.01)
*B25B 28/00*   (2006.01)

(52) U.S. Cl.
USPC .......................... 269/289 R; 269/16; 126/215

(58) Field of Classification Search
USPC ......... 269/289 R; D7/698, 611, 408; 126/215
See application file for complete search history.

(56) References Cited

U.S. PATENT DOCUMENTS

| | | | | |
|---|---|---|---|---|
| D34,669 S | * | 6/1901 | Beaumont | D7/698 |
| 830,764 A | * | 9/1906 | Braymer | 269/302.1 |
| 1,099,822 A | * | 6/1914 | Sager | 269/17 |
| D47,322 S | * | 5/1915 | Hackett | D7/698 |
| 1,771,294 A | * | 7/1930 | Hackett | 269/16 |
| D140,595 S | * | 3/1945 | Browne et al. | D7/698 |
| 2,871,848 A | * | 2/1959 | Forbes et al. | 126/215 |
| 2,903,229 A | * | 9/1959 | Lange | 248/688 |
| 3,215,063 A | * | 11/1965 | Olson et al. | 99/425 |
| D206,758 S | * | 1/1967 | Radtke | D7/393 |
| 3,819,064 A | * | 6/1974 | Chandler | 414/675 |
| 4,261,683 A | * | 4/1981 | Zaleon | 414/675 |
| D265,537 S | * | 7/1982 | Stockdale | D7/698 |
| D289,253 S | * | 4/1987 | Super | D8/71 |
| D303,198 S | * | 9/1989 | Schorn, Sr. | D7/698 |
| D326,211 S | * | 5/1992 | Allen | D7/698 |
| D341,298 S | * | 11/1993 | Ancona et al. | D7/698 |
| D366,400 S | * | 1/1996 | Dentsbier | D7/698 |
| 5,515,593 A | * | 5/1996 | Eagler | 29/426.5 |
| D385,463 S | * | 10/1997 | Cousins | D7/553.6 |
| D390,072 S | * | 2/1998 | Miller | D7/698 |
| D396,607 S | * | 8/1998 | Pender et al. | D7/611 |
| 5,791,479 A | * | 8/1998 | Beres | 206/541 |
| 6,119,583 A | * | 9/2000 | Wilkins | 99/337 |
| D438,431 S | * | 3/2001 | Kellermann | D7/553.6 |
| 6,200,212 B1 | * | 3/2001 | Henry et al. | 452/194 |
| D444,356 S | * | 7/2001 | Conaway | D7/637 |
| 6,508,368 B1 | * | 1/2003 | Arce, Jr. | 211/41.3 |
| 6,527,635 B1 | * | 3/2003 | Lundy | 452/105 |
| D493,062 S | * | 7/2004 | Caswell et al. | D7/408 |
| 6,796,221 B1 | * | 9/2004 | Cangioli | 99/425 |
| D519,278 S | * | 4/2006 | Boerma | D3/304 |
| D536,224 S | * | 2/2007 | Berger et al. | D7/673 |
| D573,420 S | * | 7/2008 | Pourounidis et al. | D7/698 |
| D604,559 S | * | 11/2009 | Woodruff | D7/408 |
| 7,661,421 B1 | * | 2/2010 | Lustig et al. | 126/215 |
| D655,939 S | * | 3/2012 | Tracy | D6/397 |
| 2007/0262038 A1 | * | 11/2007 | Harbison et al. | 211/162 |
| 2009/0250860 A1 | * | 10/2009 | Hsu | 269/309 |

* cited by examiner

*Primary Examiner* — Lee D Wilson
*Assistant Examiner* — Alvin Grant
(74) *Attorney, Agent, or Firm* — Richard Elliott Halsey

(57) ABSTRACT

A cutting board is elevated by way of a pair of leg stands, configured as longitudinal arc-shaped rod handles secured into the cutting board. Inverted, the handles receive and support various sizes of serving dishes and cooking pans in an inclined configuration and thereby functions as a device for separating liquids from foods, such as water and liquefied fats.

1 Claim, 5 Drawing Sheets

ELEVATED CUTTING BOARD APPARATUS FOR REDUCING FAT IN PAN-COOKED FOODS

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention generally relates to the field of food preparation, and more specifically to an elevated cutting board apparatus for reducing the fat content of pan-cooked foods.

2. Description of the Related Art

Fatty foods are generally understood to cause weight gain, high cholesterol, heart disease, and various other health complications in humans. The fatty drippings of meat rendered during pan cooking are retained in the pan. The benefits of a low fat diet are well known, and the removal of fats from the food is highly desired.

Ground beef is a food ingredient often used daily in many households. The usual method of preparation is usually provided on the product label, specifically, cooking the beef until it is browned and then draining off the excess liquefied fat. However, there is no method provided for draining the fat.

One method typically used by consumers is to use a colander. The cooked ground beef and excess liquefied fat are all poured together into a colander, and the fat is allowed to drain out the bottom. The difficulty is that some of the beef particles slip through the colander holes. Moreover, this is also known to be a particularly messy practice, because the liquefied fat droplets drain, traveling a distance along the semi-spherical surface along the underside of the colander, and the droplets cool. The cooled fats turn solid on the colander, thereby clogging some of the colander holes. Generally, this is also considered a messy, undesirable method.

One prior art invention, U.S. Pat. No. 5,850,779 by Zimmerman is entitled 'Pan Tilting Apparatus'. This invention is a structure adapted to rest upon a surface surrounding a conventional stovetop burner. A pan of cooking food remains on the burner. Gravity causes the fats to accumulate in a resulting lower side of the pan, while the food contents is cooked on the pan surface at an area higher along the gradient caused by the invention. The problem with this invention is that the entire amount of the fat accumulates deep and splatters on or around the nearby burners, thereby risking flashovers and grease fires.

Another reference, U.S. Patent Application Publication No. US 2011/0036797 A1, Pub. Feb. 17, 2011, describes an inclined pan holder apparatus which holds a pan of a cooked food at an incline for fat removal, but is, not built with stabilized rod bars, allowing for use as a multiple purpose cutting board.

Another method is to tilt the cooking vessel, thereby allowing gravity to separate the fats from the meat. The meat is then spooned out of the vessel, with care to avoid the pooled liquid fat. However, this method is awkward and dangerous. The meat particles often slide or roll into the pooled fats, causing splashing of fat droplets onto the surrounding area. This method is also difficult because the user cannot determine an extent to which the cooking vessel should be inclined, often relying on the slope of a raised stovetop burner to provide a gradient to drain the fats. Alternatively, the user may hold a handle of the cooking vessel, such as a pan, and tilt the pan so the fats drain away. These methods are awkward and inefficient, and may be fire hazards, because they promote grease splatter near a stovetop.

There is a need for an invention that supports a cooking vessel, such as a frying pan, off and away from the stove top, for the purpose of safely draining the hot liquefied fats. The present invention is such a device with a solid heat-resistant base, such as a cutting board made of tempered wood, granite, or steel, and a means to support the vessel securely and firmly in an inclined orientation so that gravity can be used to separate liquids from food.

BRIEF SUMMARY OF THE INVENTION

An elevated cutting board has a major surface for use as a cutting surface, and an opposite minor surface underneath. Arc-shaped rod handles are secured into the minor surface as a support means to elevate the cutting board. Inverted, the rod handles project upwardly from the minor surface and function to support a pan in a secured and inclined configuration that facilitates separation of liquids from food.

Figure 1:
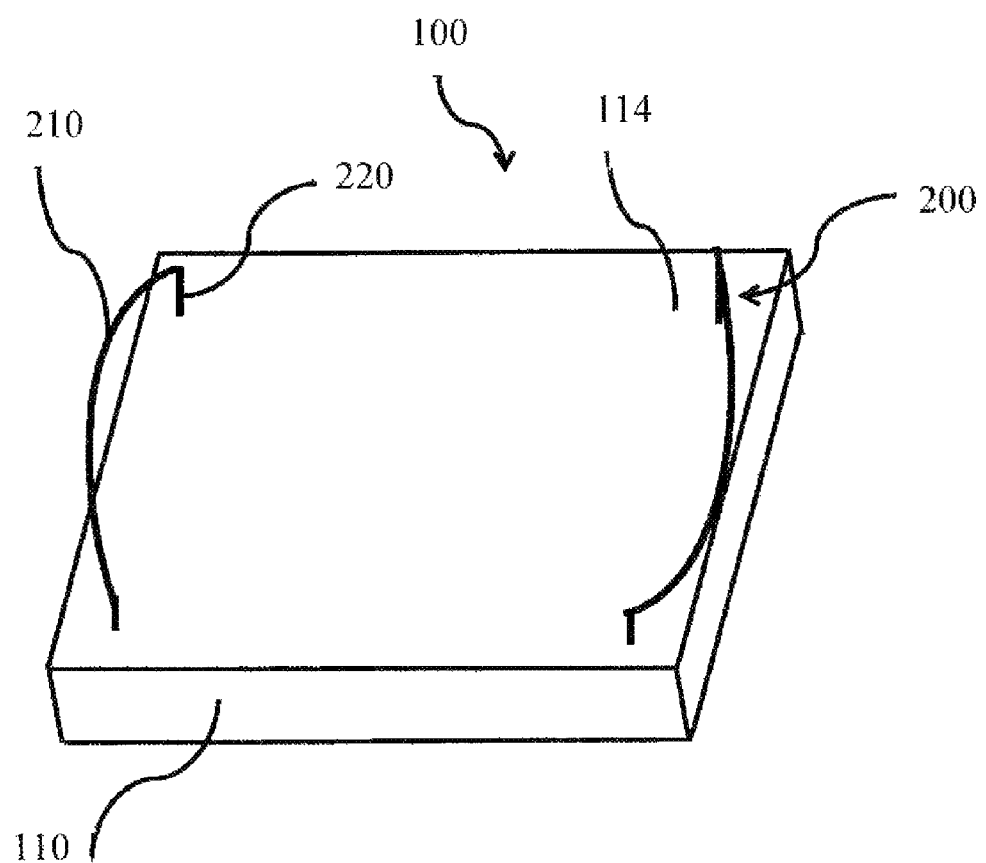
FIG. 1 is view in perspective of the cutting board apparatus invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The present invention includes many aspects and features. Looking at FIG. 1, a cutting board assembly 100 includes a cutting board 110 with a minor surface 114 of the cutting board having a pair of rod handles 200 secured thereon. A major surface 112 of the cutting board 110 is exposed for use as a cutting surface and is opposite the minor surface 114. The rod handles 200 serve as opposing leg stands which elevate the cutting board 110.

The rod handles 200 have a rod body 210 and rod posts 220. The rod posts are formed substantially perpendicular to the rod bodies 210, and in the preferred embodiment, the rod posts 220 are contiguous portions of the rod bodies 210. The rod posts 220 project outwardly from, and substantially perpendicular to, the minor surface 114 of the cutting board 110. In the preferred embodiment, the rod bodies 210 are formed in an arc shape and are spaced about 1 to 1 and ¼ inches from the minor surface 114.

Each respective end of the rod bodies 210 connects with the respective ends of the rod posts 220, in order to support the rod bodies 210 above the minor surface 114 of the cutting board 110. The rod bodies 210 extend longitudinally, substantially planar to each other, so that they may serve as stable elevating leg supports for the major surface 112 to be used as a cutting surface.

Each end of the rod posts 220 is inserted into a respective accommodating aperture formed in the cutting board 110. The rod posts 220 are secured into the cutting board 110 by friction fit, which rigidly secures the rod posts 220 therein but allows removal when a user grasps and pulls the handle 210.

Figure 2:
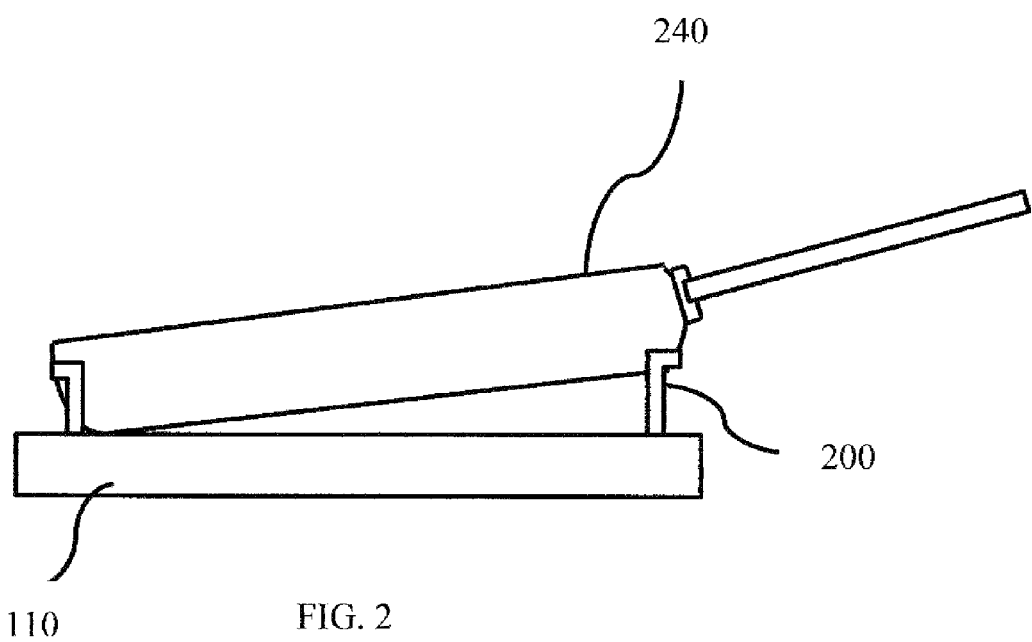
FIG. 2 is a view in perspective of the invention retaining and, supporting a frying pan.

Looking at FIG. 2, inverting the cutting board 110 allows the rod handles 200 to perform the dual purposes of receiving and retaining a food vessel 240 in multiple configurations. A food vessel 240 includes a cooking vessel, such as a frying pan and a food serving dish, such as a casserole dish.

Figure 3:
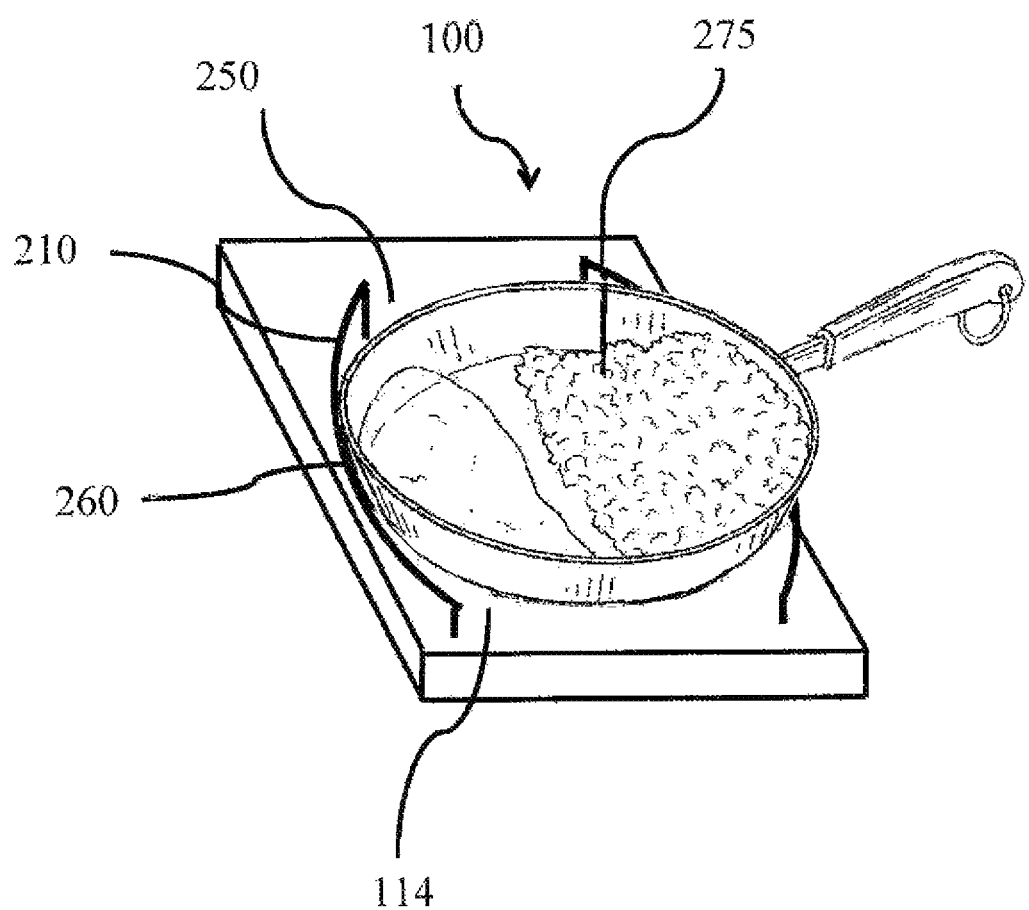
FIG. 3 is a top view in perspective of the invention retaining a frying pan with liquid fats separated from the cooked food.

FIG. 3 demonstrates how the cutting board apparatus 100 separates liquefied fats 260 form a cooked food 275. The arc shape of the rod bodies 210 accommodates the circular shape of standard household cooking pots and pans. AS seen in FIG. 3, the rod bodies 210 primarily function to stabilize the food vessel 250 in an inclined configuration in order to separate undesired liquids 260 from a cooked food 275. The pan 250 is placed in the apparatus so that an outer surface of a sidewall of the pan 250 abuts an inner side of the longitudinal rod body 210. A bottom area of the pan 250 is received by an area on the minor surface 114 of the cutting board 110 adjacent to the inward facing portion of the rod body 210. In the preferred embodiment, the rod bodies 210 are curved to the radius of a standard household 12-inch frying pan, because it is most commonly used in household food preparation.

Figure 4:
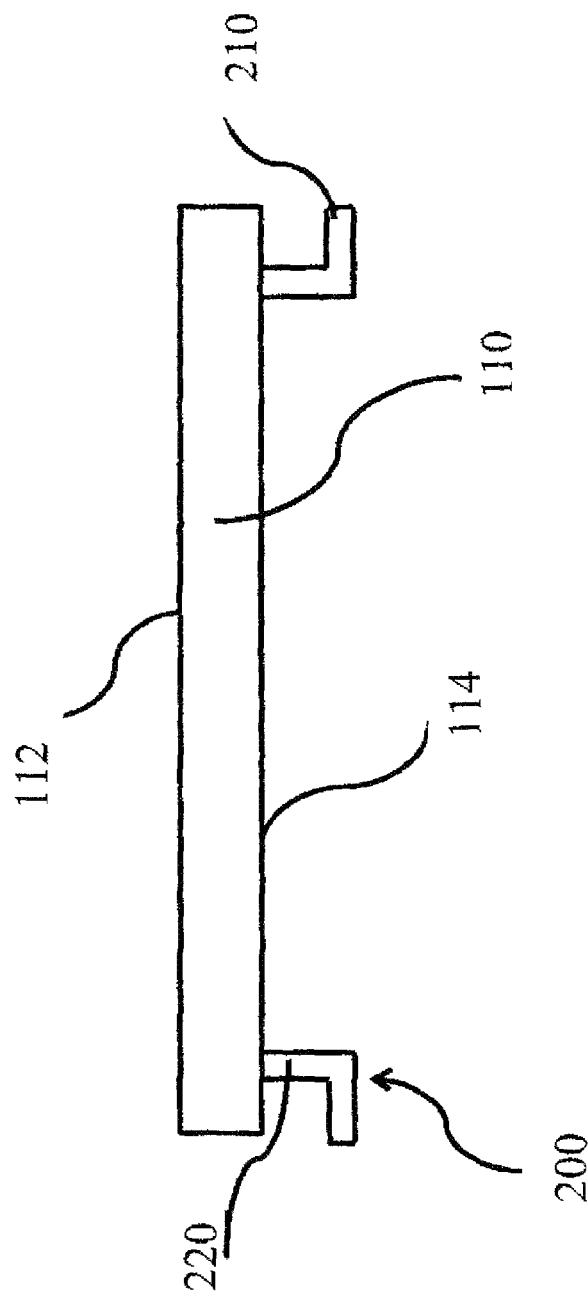
FIG. 4 is a side view demonstrating the cutting board major surface exposed as a cutting surface with the rod handles as supporting legs.

As demonstrated in FIG. 3, the pan 250 rests in a secured inclined configuration atop the opposing rod body 210 and a gradient is formed. Gravity causes liquids 260 to accumulate in a lower area of the pan 250 as the user gathers the cooked food 275 toward the upper area of the pan 250. Typically, the user would use a spatula or a large spoon to do this task. The primary use of the invention is to separate liquefied fats from cooked hamburger, but the invention can also be useful, for example, to separate water from cooked vegetables As seen in FIG. 4, the rod handles 200 serve to suspend and to support the cutting board 110 for use of the major surface 112 as a cutting surface. The rod bodies 210 have a rubber coating that provides friction on a surface such as a kitchen countertop. The coating on the handles 200 create friction to prohibit sliding along the countertop surface as a user applies pressure while chopping food on the major surface 112 of the cutting board 110. Additionally, the invention can even be used as a food vessel trivet, in order to support the vessel on a tabletop for serving the food.

Figure 5:
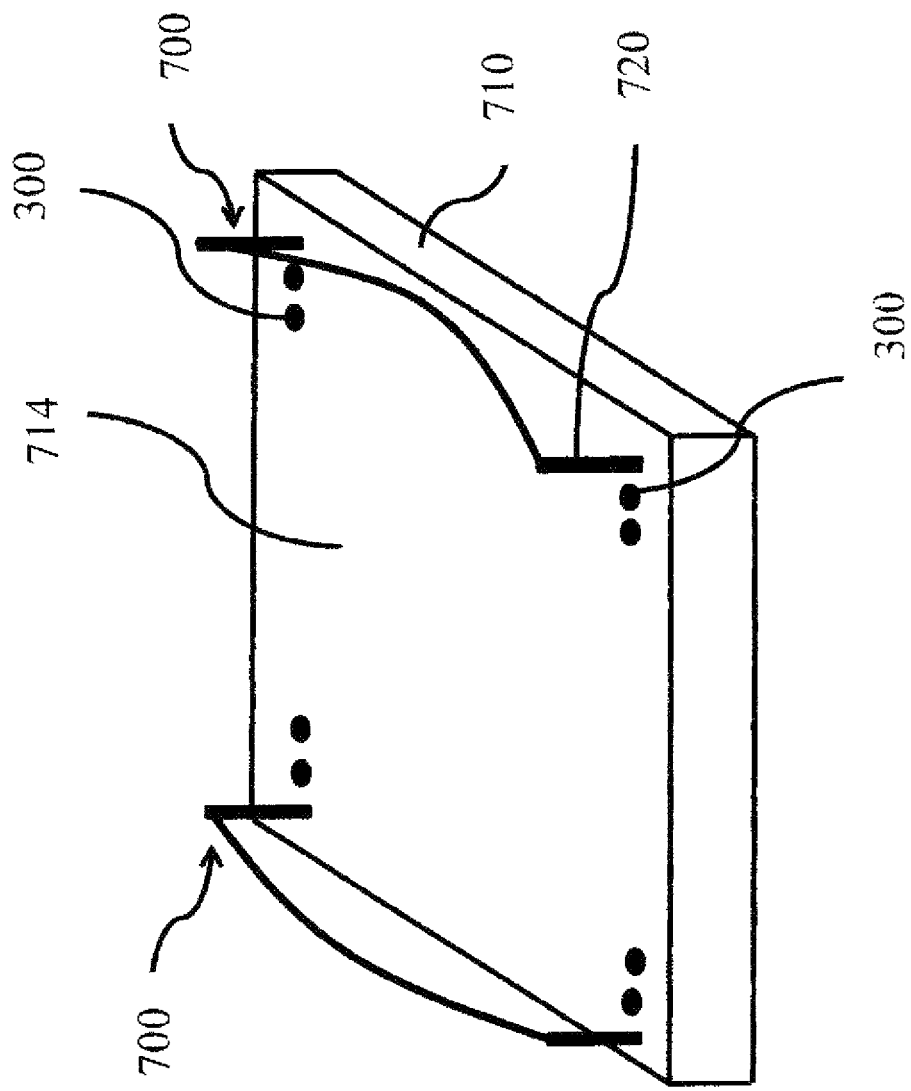
FIG. 5 is a top view in perspective of an embodiment of a cutting board apparatus with multiple apertures for adjustable rod handles.

In another embodiment, seen in FIG. 5, the opposing pair of rod handles 700 are attached to a minor surface 714 of an adjustable on the cutting board 710. Multiple apertures 300 allow the rod posts 720 to be made removable from the apertures. In this way, the rod handles 720 may be adjustably set into the respective apertures 300 in order to accommodate various sizes of food vessels.

While certain preferred embodiments of the present invention have been disclosed in detail, it is to be understood that various modifications may be adopted without departing from the spirit of the invention or scope of the following claims.

The invention claimed is:

1. A cutting board assembly, comprising:
   (a) an elevated cutting board with a major surface of the cutting board exposed for use as a cutting surface, and a minor surface of the cutting board exposed to receive a food vessel,
   (b) at least two longitudinal arc-shaped rod handles are secured to said cutting board substantially planar with each other and parallel to said minor surface, each of said arc-shaped rod handles having an arc-shaped rod body having first and second opposing rod handle ends, with first and second opposing rod posts configured substantially perpendicular to said arc-shaped rod bodies,
   wherein said cutting board minor surface has multiple apertures for accepting said rod handle ends, said arc-shaped rod handles elevate said cutting board, whereupon inverting said cutting board assembly, said arc-shaped rod handles receive and retain a foods.

* * * * *